(12) United States Patent
Ingulsrud (10) Patent No.: US 8,396,657 B2
(45) Date of Patent: Mar. 12, 2013

(54) TECHNIQUES TO IMPROVE LOCATION ACCURACY FOR A MAP

(75) Inventor: Joel Ingulsrud, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1639 days.

(21) Appl. No.: 11/315,564

(22) Filed: Dec. 22, 2005

(65) Prior Publication Data

US 2007/0150186 A1   Jun. 28, 2007

(51) Int. Cl.
*G01C 21/00* (2006.01)
*G01C 21/34* (2006.01)

(52) U.S. Cl. .................................. 701/411; 701/408

(58) Field of Classification Search .............. 701/207, 701/211

See application file for complete search history.

(56) References Cited

U.S. PATENT DOCUMENTS 6,253,151 B1 * 6/2001 Ohler et al. ............... 701/409
6,487,495 B1 * 11/2002 Gale et al. ................. 701/461

OTHER PUBLICATIONS

PCT Notification of Transmittal of the International Search Report and the Written Opinion of the International Searching Authority, or the Declaration based on International Application No. PCT/US2006/048610, date of mailing of the International Search Report Jul. 16, 2007 (11 pgs. total).

* cited by examiner

*Primary Examiner* — Ian Jen (57) ABSTRACT

Techniques to improve location accuracy for a map are described. An apparatus may comprise a mobile computing device. The mobile computing device may include a map management module to move a location identifier representing a location from a first position to a second position on an electronic map in accordance with digital map correction information as defined by a user. Other embodiments are described and claimed.

10 Claims, 6 Drawing Sheets

TECHNIQUES TO IMPROVE LOCATION ACCURACY FOR A MAP

BACKGROUND

A mobile computing device such as a smart phone may have voice and data communications capabilities as well as processing capabilities. The processing capabilities may allow a mobile computing device to store and display cartographic information, such as an electronic map. Electronic maps are rendered using relatively large volumes of information, and therefore are typically stored in an electronic database in memory. In many cases, the information for the map may be incorrect or become outdated over time. Accordingly, there may be a need for improved techniques to solve these and other problems.

DETAILED DESCRIPTION

Various embodiments may be directed to techniques to improve location accuracy for a map. In one embodiment, for example, a mobile computing device may comprise a map management module. The map management module may be arranged to move or reposition a location identifier representing a location from a first position to a second position on an electronic map in accordance with digital map correction information as defined by a user. This may be useful, for example, when the first position for the location identifier is incorrect. In this manner, a user may correct placement of a location identifier for a location on an electronic map, rather than waiting for corrections to be implemented by the original map provider or designer. Other embodiments are described and claimed.

Figure 1:
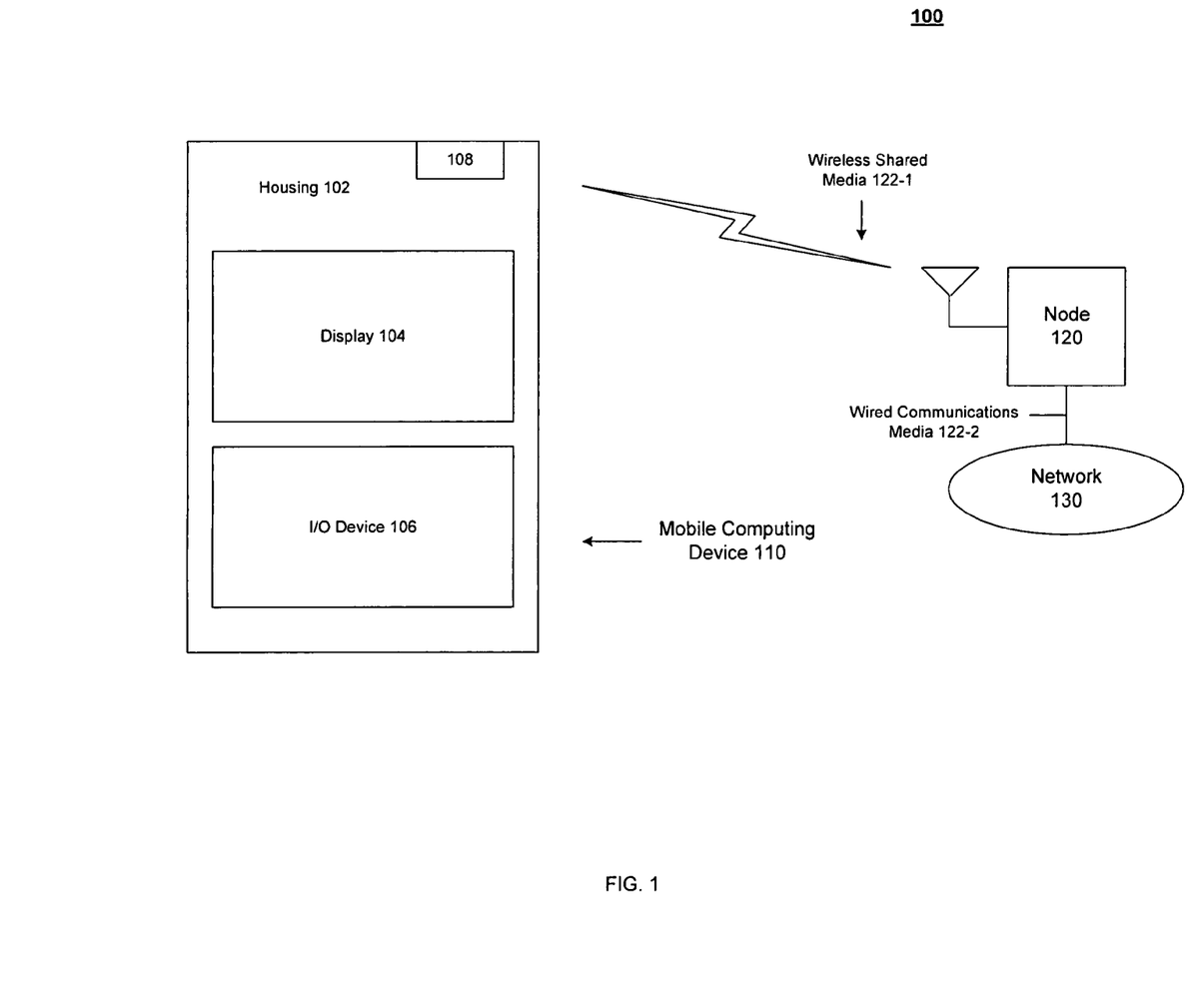
FIG. 1 illustrates one embodiment of a communications system.

FIG. 1 illustrates one embodiment of a communications system 100. In various embodiments, communications system 100 may be implemented as a wireless communication system, a wired communication system, or a combination of both. When implemented as a wireless communication system, communications system 100 may include components and interfaces suitable for communicating over wireless shared media 122-1, such as one or more antennas, transmitters, receivers, transceivers, amplifiers, filters, control logic, and so forth. An example of wireless shared media 122-1 may include portions of a wireless spectrum, such as the RF spectrum and so forth. When implemented as a wired communications system, communications system 100 may include components and interfaces suitable for communicating over wired communications media 122-2, such as input/output (I/O) adapters, physical connectors to connect the I/O adapter with a corresponding wired communications medium, a network interface card (NIC), disc controller, video controller, audio controller, and so forth. Examples of wired communications media 122-2 may include a wire, cable, metal leads, printed circuit board (PCB), backplane, switch fabric, semiconductor material, twisted-pair wire, co-axial cable, fiber optics, and so forth. The embodiments are not limited in this context.

In various embodiments, communications system 100 may include a mobile computing device 110. Mobile computing device 110 may comprise any device having a processing system and a portable power source (e.g., a battery). Examples of a mobile computing device may include a computer, laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device may also include computers that are arranged to be worn by a person, such as a wrist computer, finger computer, ring computer, eyeglass computer, belt-clip computer, arm-band computer, shoe computers, clothing computers, and other wearable computers. In one embodiment, for example, mobile computing device 110 may be implemented as a smart phone having both wireless voice and/or data communications capabilities, as well as processing capabilities. Although some embodiments may be described with mobile computing device 110 implemented as a smart phone by way of example, it may be appreciated that other embodiments may be implemented using other mobile computing devices as well. The embodiments are not limited in this context.

As shown in FIG. 1, mobile computing device 110 may comprise a housing 102, a display 104, an input/output (I/O) device 106, and an antenna 108. Display 104 may comprise any suitable display unit for displaying information appropriate for a mobile computing device. I/O device 106 may comprise any suitable I/O device for entering information into a mobile computing device. Examples for I/O device 106 may include an alphanumeric keyboard, a numeric keypad, a touch pad, input keys, buttons, switches, rocker switches, microphones, audio interfaces, video interfaces, and so forth. The embodiments are not limited in this context.

In one embodiment, communications system 100 may include a wireless device 120. Wireless device 120 may comprise, for example, a mobile or fixed wireless device. In one embodiment, for example, wireless device 120 may comprise a fixed wireless device operating as an access point for a network or communications system, such as a cellular radiotelephone communications system, a wireless local area network (WLAN), a wireless metropolitan area network (WMAN), a wireless wide area network (WWAN), and so forth. Examples for wireless device 120 may include a wireless access point, base station or device B, base station radio/transceiver, router, switch, hub, gateway, and so forth. In one embodiment, for example, wireless device 120 may comprise a base station for a cellular radiotelephone communications system. Although some embodiments may be described with wireless device 120 implemented as a base station by way of example, it may be appreciated that other embodiments may be implemented using other wireless devices as well. The embodiments are not limited in this context.

In one embodiment, mobile computing device 110 and wireless device 120 may comprise part of a cellular radiotelephone system. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, mobile computing device 110 and wireless device 120 may be arranged to perform data communications using any number of different wireless protocols over wireless shared media 122-1. In one embodiment, for example, mobile computing device 110 and wireless device 120 may be arranged to perform data communications using any number of different WWAN data communication services. Examples of cellular data communication systems offering WWAN data communication services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth. In one embodiment, for example, mobile computing device 110 and wireless device 120 may also be arranged to communicate using a number of different WLAN data communication services. Examples of suitable WLAN data communication services may include the Institute of Electrical and Electronics Engineers (IEEE) 802.xx series of protocols, such as IEEE 802.11a/b/g/n, IEEE 802.16, IEEE 802.20, and so forth. In one embodiment, for example, mobile computing device 110 and wireless device 120 may be further arranged to communicate using a number of shorter range wireless protocols, such as a wireless personal area network (PAN) protocols, an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electromagnetic induction (EMI) techniques. An example of EMI techniques may include passive or active radio-frequency identification (RFID) protocols and devices. The embodiments are not limited in this respect.

In one embodiment, communications system 100 may include network 130 connected to wireless device 120 by wired communications medium 122-2. Network 130 may comprise additional devices and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. In one embodiment, for example, network 130 may be arranged to communicate information in accordance with one or more Internet protocols as defined by the Internet Engineering Task Force (IETF), such as the Transmission Control Protocol/Internet Protocol (TCP/IP), for example. Network 130 may also include other cellular radio telephone system infrastructure and equipment, such as base stations, mobile subscriber centers, central offices, and so forth. The embodiments are not limited in this context.

In general operation, mobile computing device 110 may be capable of storing and executing a number of application programs. One example of an application program may comprise a mapping application. The mapping application may create an electronic map using digital map information stored in a map information database. The mapping application may be interactive, such as allowing a user to adjust the level of detail displayed for the electronic map. For example, a user may typically increase or decrease the scale of a map (e.g., zoom in or zoom out) and therefore a corresponding amount of map detail. Zoom operations may be performed using a number of different techniques, such as replacing a map with a more detailed map, enlarging the same map without enlarging the pixels thereby showing more detail, enlarging the same map with the pixels enlarged (e.g., replaced by rectangles of pixels), using interpolation techniques, and so forth. The mapping application may perform any number of mapping operations, such as geocoding operations, display operations, routing operations, navigation operations, and so forth. The mapping application may be used, for example, as part of automotive navigation systems, mobile navigation devices, network based mapping applications (e.g., Internet maps), and others.

One problem associated with electronic maps, however, is that the digital map information used to create the electronic maps may not be corrected by a user. An electronic map may be created using digital map information stored in a map information database. The digital map information may be collected at the data-gathering survey level using, for example, a Geographic Information System (GIS). The digital map information may be provided by any number of map data providers, such as a NAVTEQ™ Corporation, Tele Atlas Nev., and others. In some cases, however, the digital map information may be incorrect. For example, an address may have incorrect location information, such as latitude coordinates, longitude coordinates, altitude or elevation information, and so forth. Consequently, the mapping application may display a location identifier representing a given location at an incorrect position on the electronic map. Accordingly, the user may be incapable of updating or correcting the incorrect location since the map data providers typically do not allow a user to access the digital map information stored in the map information database.

Various embodiments may attempt to solve these and other problems. Various embodiments may be directed to techniques to improve location accuracy for a map. In one embodiment, for example, a mobile computing device may comprise a map management module. The map management module may allow a user to modify or correct an electronic map. The map management module may be implemented as part of a mapping application, or alternatively, separately from the mapping application. In the latter case, the map management module may include various software and/or hardware interfaces (e.g., Application Program Interfaces) to exchange information with a given mapping application.

In various embodiments, the map management module may be arranged to move or reposition a location identifier representing a location from a first position to a second position on an electronic map in accordance with digital map correction information as defined by a user. This may be useful, for example, when the first position for the location identifier is incorrect. In this case, a user may use the map management module to move or reposition the location identifier to the correct position on the electronic map.

In various embodiments, the map management module may comprise a map location module, a map correction module, and a map display module. In one embodiment, for example, a map location module may be arranged to generate map location correction information for a location in response to user input. The map location correction information may be used to replace predefined map location information for the location. In one embodiment, for example, a map correction module may be arranged to store the map location correction information in a map correction database. The map correction database may then be used to perform user defined corrections to the electronic map. In one embodiment, for example, the map display module may be arranged to display the location identifier at the second position on the electronic map using the map location correction information. In this manner, a user may correct, change, annotate, update, or otherwise modify an electronic map with user defined information. Mobile computing device 110 in general, and the map management module in particular, may be described in more detail with reference to FIG. 2.

Figure 2:
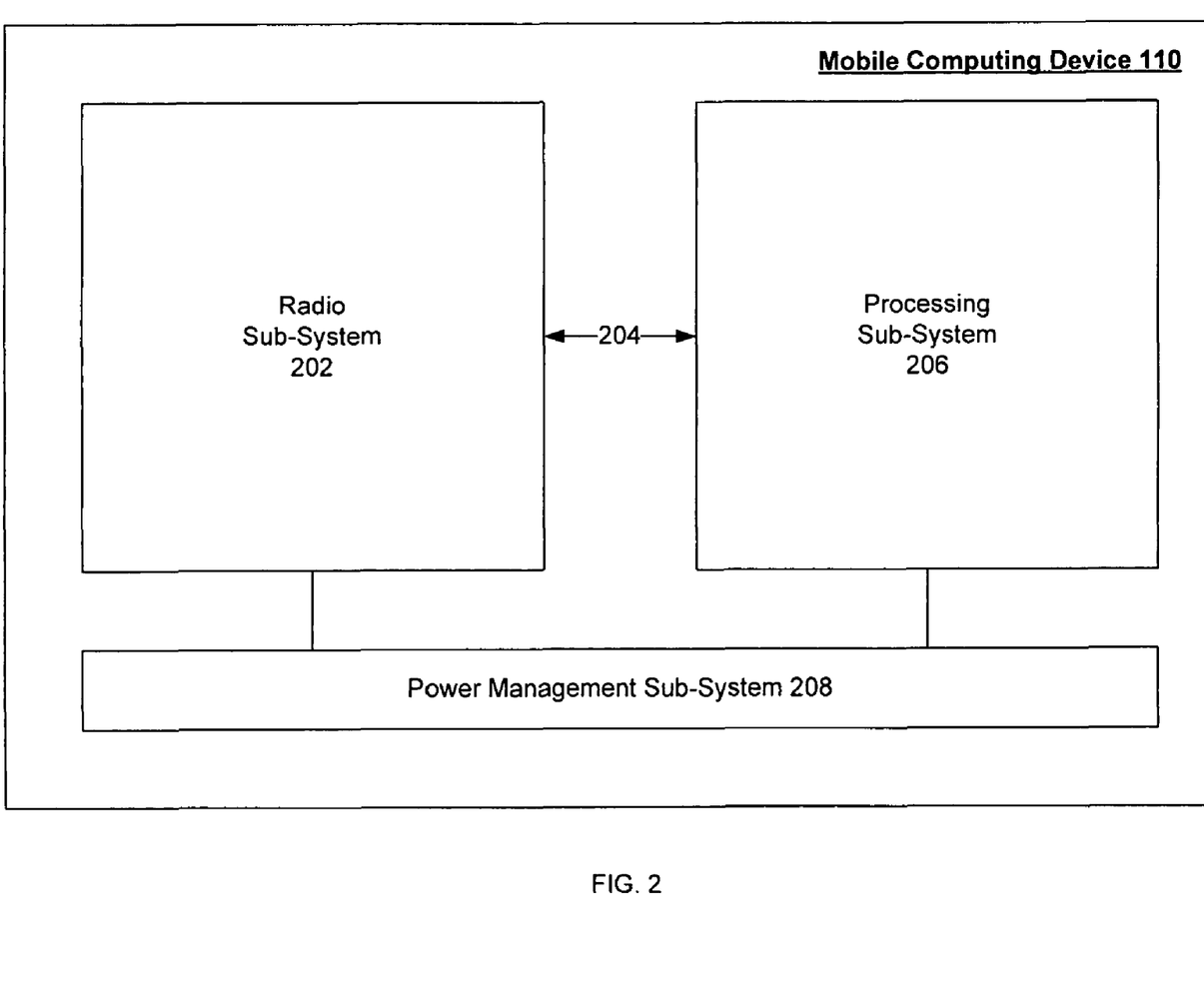
FIG. 2 illustrates one embodiment of a mobile computing device.

FIG. 2 illustrates one embodiment a mobile computing device. FIG. 2 illustrates a more detailed block diagram of mobile computing device 110 as described with reference to FIG. 1. As shown in FIG. 2, mobile computing device 110 may comprise multiple elements. Although FIG. 2 shows a limited number of elements in a certain topology by way of example, it can be appreciated that more or less elements in any suitable topology may be used in mobile computing device 110 as desired for a given implementation. Furthermore, any element as described herein may be implemented using hardware, software, or a combination of both, as previously described with reference to device implementations. The embodiments are not limited in this context.

In various embodiments, mobile computing device 110 may include a radio sub-system 202 connected via bus 204 to a processing sub-system 206. Radio sub-system 202 may perform voice and data communications operations using wireless shared media 122-1 for mobile computing device 110. Processing sub-system 206 may execute software for mobile computing device 110. Bus 204 may comprise a USB or micro-USB bus and appropriate interfaces, as well as others.

In various embodiments, mobile computing device 110 may also include a power management sub-system 208. Power management sub-system 208 may manage power for mobile computing device 110, including radio sub-system 202, processing sub-system 206, and other elements of mobile computing device 110. For example, power management sub-system 208 may include one or more batteries to provide direct current (DC) power, and one or more alternating current (AC) interfaces to draw power from a standard AC main power supply. The embodiments are not limited in this context.

Figure 3:
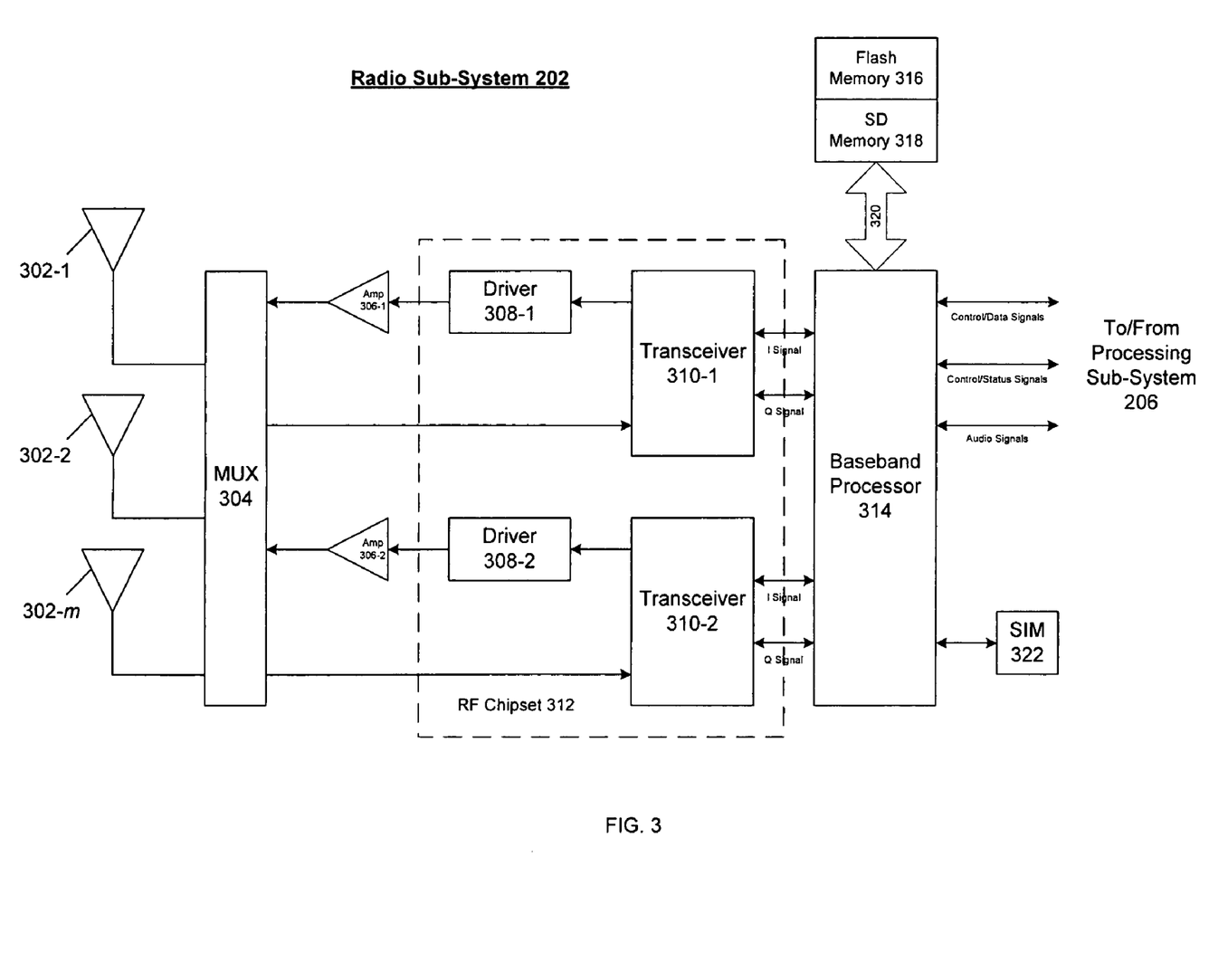
FIG. 3 illustrates one embodiment of a radio sub-system.

FIG. 3 illustrates one embodiment a radio sub-system. FIG. 3 illustrates a more detailed block diagram of radio sub-system 202 as described with reference to FIG. 2. Radio sub-system 202 may perform voice and data communication operations for mobile computing device 110. For example, radio sub-system 202 may be arranged to communicate voice information and control information over one or more assigned frequency bands of wireless shared media 122-1. The embodiments are not meant to be limited, however, to the example given in FIG. 3.

In various embodiments, radio sub-system 202 may include one or more antennas 302-1-$m$. Antennas 302-1-$m$ may be used for transmitting and/or receiving electrical signals. Examples for antennas 302-1-$m$ may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. During transmission, antennas 302-1-$m$ may accept energy from a transmission line and radiate this energy into space via wireless shared media 122-1. During reception, antennas 302-1-$m$ may gather energy from an incident wave received over wireless shared media 122-1, and provide this energy to a corresponding transmission line. The amount of power radiated from or received by antennas 302-1-$m$ is typically described in terms of gain. Radio sub-system 202 may be implemented using a single antenna 302-1, or using an array of antennas 302-1-$m$ array, such as a quad band antenna array, for example. Multiple antennas may be desirable when implementing spatial diversity and/or Multiple-Input-Multiple-Output (MIMO) systems. The embodiments are not limited in this context.

In various embodiments, antennas 302-1-$m$ may be connected to a multiplexer 304. Multiplexer 304 multiplexes signals from power amplifiers 306-1, 306-2 for delivery to antennas 302-1-$m$. Multiplexer 304 demultiplexes signals received from antennas 302-1-$m$ for delivery to RF chipset 312. The embodiments are not limited in this context.

In various embodiments, multiplexer 304 may be connected to power amplifiers 306-1, 306-2. Power amplifiers 306-1, 306-2 may be used to amplify any signals to be transmitted over wireless shared media 122-1. Power amplifiers 306-1, 306-2 may work in all assigned frequency bands, such as 4 frequency bands in a quad-band system. Power amplifiers 306-1, 306-2 may also operate in various modulation modes, such as Gaussian Minimum Shift Keying (GSMK) modulation suitable for GSM systems and 8-ary Phase Shift Keying (8-PSK) modulation suitable for EDGE systems. The embodiments are not limited in this context.

In various embodiments, power amplifiers 306-1, 306-2 may be connected to an RF chipset 312. RF chipset 312 may also be connected to multiplexer 304. In one embodiment, for example, RF chipset 312 may comprise one or more transceivers in a transceiver array. For example, RF chipset 312 may include RF drivers 308-1, 308-2 each coupled to RF transceivers 310-1, 310-2, respectively. RF chipset 312 may perform modulation and direct conversion operations required for GMSK and 8-PSK signal types for quad-band E-GPRS radio, for example. RF chipset 312 receives analog I & Q signals from a baseband processor 314, and converts them to an RF signal suitable for amplification by power amplifiers 306-1, 306-2. Similarly, RF chipset 312 converts the signals received from wireless shared media 122-1 via antennas 302-1-$m$ and multiplexer 304 to analog I & Q signals to be sent to baseband processor 314. RF chipset 312 may be implemented using one or more chips as desired for a given implementation. The embodiments are not limited in this context.

In some embodiments, each transceiver 310-1, 310-2 may be arranged to perform data communications in accordance with a different set of wireless communications protocols and techniques. In one embodiment, for example, transceiver 310-1 may be arranged to communicate information in accordance with a first class of wireless communications protocols and techniques that are generally associated with cellular radiotelephone communication systems. Examples of the first class of protocols may include WWAN protocols, such as GSM/GPRS protocols, CDMA/1xRTT protocols, EDGE protocols, EV-DO protocols, EV-DV protocols, HSDPA protocols, and so forth. In one embodiment, for example, transceiver 310-2 may be arranged to communicate information in accordance with a second class of wireless communications protocols and techniques that are generally associated with a computer network. Examples of the second class of protocols may include WLAN protocols, such as one or more of the IEEE 802.xx series of protocols, such as IEEE 802.11a/b/g/n, IEEE 802.16, IEEE 802.20, and so forth. Other examples of the second class of protocols may include PAN protocols, Infrared protocols, Bluetooth protocols, EMI protocols including passive or active RFID protocols, and so forth. It may be appreciated that although the various protocols have been generally separated into a first class and a second class, it may be appreciated that transceivers 310-1, 310-2 may be arranged to use any type of protocol from either class as desired for a given implementation. It may also be appreciated that although RF chipset 312 is shown with two transceivers 310-1, 310-2 by way of example, RF chipset 312 may be implemented using more or less transceivers as desired for a given implementation. The embodiments are not limited in this respect.

In various embodiments, RF chipset 312 may be connected to baseband processor 314. Baseband processor 314 may perform baseband operations for radio sub-system 202. Baseband processor 314 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, GMSK modulators, GPRS ciphers, transceiver controls, automatic frequency control (AFC), automatic gain control (AGC), power amplifier (PA) ramp control, and other circuits. The embodiments are not limited in this context.

In various embodiments, baseband processor 314 may also be connected to one or more memory units via a memory bus 320. In one embodiment, for example, baseband processor 314 may be connected to a flash memory unit 316 and a secure digital (SD) memory unit 318. Memory units 316, 318 may be removable or non-removable memory. In one embodiment, for example, baseband processor 314 may use approximately 1.6 megabytes of static read-only memory (SRAM) for E-GPRS and other protocol stack needs.

In various embodiments, baseband processor 314 may also be connected to a subscriber identity module (SIM) 322. Baseband processor 314 may have a SIM interface for SIM 322. SIM 322 may comprise a smart card that encrypts voice and data transmissions and stores data about the specific user so that the user can be identified and authenticated to the network supplying voice or data communications. SIM 322 may also store data such as personal phone settings specific to the user and phone numbers. SIM 322 can be removable or non-removable. The embodiments are not limited in this context.

In various embodiments, baseband processor 314 may further include various interfaces for communicating with a host processor of processing sub-system 206. For example, baseband processor 314 may have one or more universal asynchronous receiver-transmitter (UART) interfaces, one or more control/status lines to the host processor, one or more control/data lines to the host processor, and one or more audio lines to communicate audio signals to an audio sub-system of processing sub-system 206. The embodiments are not limited in this context.

Figure 4:
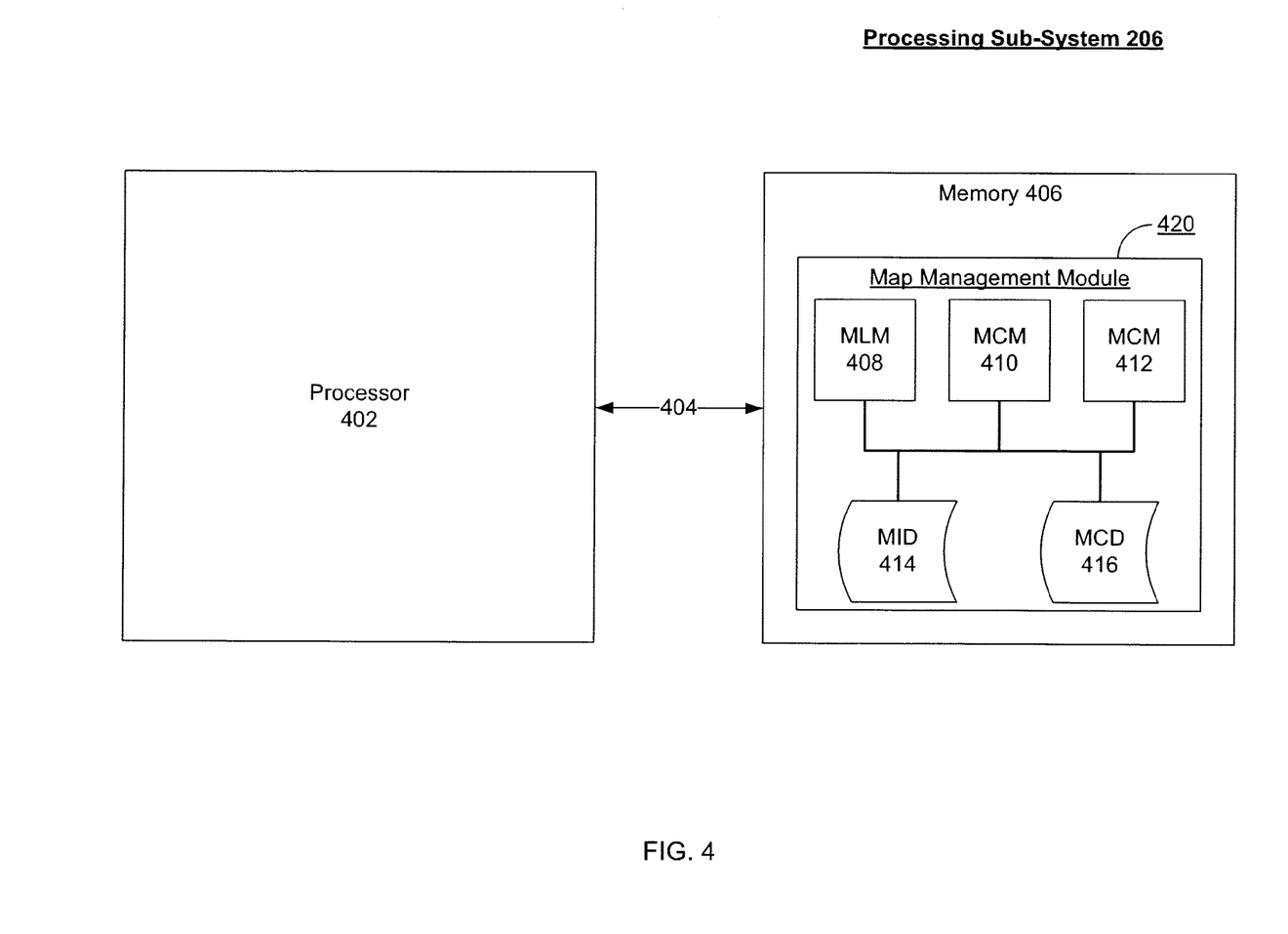
FIG. 4 illustrates one embodiment of a processing subsystem.

FIG. 4 illustrates one embodiment a processing sub-system. FIG. 4 illustrates a more detailed block diagram of processing sub-system 206 as described with reference to FIG. 2. Processing sub-system 206 may provide computing or processing operations for mobile computing device 110. For example, processing sub-system 206 may be arranged to execute various software programs for mobile computing device 110. Although processing sub-system 206 may be used to implement certain operations for various embodiments as software executed by a processor, it may be appreciated that the operations performed by processing sub-system 206 may also be implemented using hardware circuits or structures, or a combination of hardware and software, as desired for a particular implementation. The embodiments are not limited in this context.

In various embodiments, mobile computing device 110 may be capable of executing various types of software programs using processing sub-system 206. Software programs may be generally grouped into application programs and system programs. Application programs allow a user to accomplish one or more specific tasks. Typical applications include office suites, business software, educational software, databases, communications software, computer games, and so forth. Examples of application programs may include mail programs, web browsers, personal information manager applications, calendar programs, scheduling programs, contact management programs, gaming programs, word processing programs, spreadsheet programs, picture management programs, video reproduction programs, audio reproduction programs, groupware programs, and so forth. Most application software has a graphical user interface (GUI) to communicate information between a device and a user. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, and so forth.

In various embodiments, processing sub-system 206 of mobile computing device 110 may be capable of executing various types of system programs, such as different OS. In computing, an OS is the system software responsible for the direct control and management of hardware and basic system operations. Additionally, it provides a foundation upon which to run application software such as word processing programs and web browsers. Mobile computing device 110 may utilize any OS suitable for smaller form factor devices, such as a Palm OS®, Palm OS® Cobalt, Microsoft Windows® CE, Microsoft Pocket PC, Symbian OS™, Embedix OS, and others. The embodiments are not limited in this context.

In various embodiments, processing sub-system 206 may include processor 402. Processor 402 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 402 may be implemented as a general purpose processor, such as a processor made by Intel® Corporation, Santa Clara, Calif. Processor 402 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing sub-system 206 may include memory 406 to connect to processor 402. Memory 406 may be implemented using any machine-readable or computer-readable media capable of storing data, including both volatile and non-volatile memory. For example, memory 406 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 406 may be included on the same integrated circuit as processor 402 thereby obviating the need for bus 404. Alternatively some portion or all of memory 406 may be disposed on an integrated circuit or other medium, for example a hard disk drive, that is external to the integrated circuit of processor 402, and processor 402 may access memory 406 via memory bus 404. The embodiments are not limited in this context.

In various embodiments, memory 406 may store one or more software components. A software component may refer to one or more programs, or a portion of a program, used to implement a discrete set of operations. In one embodiment, for example, memory 406 may include one or more software components, such as a map management module (MMM) 420. MMM 420 may perform certain mapping operations for mobile computing device 110, such as correcting location information for an electronic map. MMM 420 may further include a map location module (MLM) 408, a map correction module (MCM) 410, and a map display module (MDM) 412. It is worthy to note that although some embodiments may describe these modules as software components executed by processing sub-system 206, it may be appreciated that some or all of the operations of the software components may be implemented using other processors accessible by mobile computing device 110, such as baseband processor 314, for example. Furthermore, these modules may also be implemented using dedicated hardware circuits or structures, or a combination of dedicated hardware and software, as desired for a given implementation. The embodiments are not limited in this context.

In various embodiments, MMM 420 may be arranged to move or reposition a location identifier representing a location from a first position to a second position on an electronic map in accordance with digital map correction information as defined by a user. This may be useful, for example, when the first position for the location identifier is incorrect. In this case, a user may use the map management module to move or reposition the location identifier to the correct position on the electronic map. It may be appreciated that the terms "first position" and "second position" are used to differentiate between different positions on an electronic map, and do not necessarily represent or imply a particular sequence of positions, limits to a number of positions, or a given temporal order. The embodiments are not limited in this context.

In various embodiments, MMM 420 may be integrated with, or form part of, a mapping application. Examples of a mapping application may include any mapping application capable of retrieving and displaying digital map information, such as the Tom Tom® Navigator 5 made be Tom Tom International BV, and others as well. The particular type of mapping application used with MMM 420 is not limited in this context. Alternatively, MMM 420 may be implemented as independent elements arranged to operate with an existing mapping application. In this case, MMM 420 may have the appropriate interfaces (e.g., API) to communicate information with the resident mapping application to implement all or some of the operations described herein. The embodiments are not limited in this context.

In various embodiments, MMM 420 may include a map information database (MID) 414. MID 414 may store digital map information typically provided by a map data provider. Examples of digital map information may include street address information, vector contours of geological features, streets, buildings, right-of-way, and other map features.

In one embodiment, for example, the digital map information may include map address information and map location information. The map address information may refer to any information used to uniquely identify a place, such as a commercial building, personal residence, point of interest, and so forth. Examples of map address information may include country, state, zip code, county, street name, street number, and so forth. The map location information may refer to any information used to uniquely identify a physical location for an address, such as latitude coordinates, longitude coordinates, altitude or elevation information, and so forth. The map address information and map location information may have any desired level of granularity and detail as desired for a given implementation.

MID 414 may store the digital map information using various data structures, such as map information records with one or more defined fields. MMM 420 may use the map information to retrieve and display information for a map. An example of a set of map information records for MID 414 may be shown in Table 1 as follows:

TABLE 1

| Country | State | County | City | Street | Number | Latitude | Longitude | Altitude |
|---|---|---|---|---|---|---|---|---|
| USA | PA | Allegheny | Wexford | Brooktree | 4500 | 41.6155120 | −81.0599940 | 362 meters |
| USA | CA | Santa Clara | Sunnyvale | Maude | 2100 | 37.3947650 | −122.0469970 | 40 meters |
| USA | CA | Santa Clara | San Jose | First Street | 1732 | 37.3678670 | −121.9138980 | 39 meters |

As shown in Table 1, MID 414 may include any number of map information records. Each map information record may include map address information and map location information. In this example, the map address information may include the information stored in the fields labeled Country, State, County, City, Street and Number, and the map location information may include the information stored in the fields labeled Latitude, Longitude and Altitude. The values for the map location information may correspond to any number of different coordinate systems, and may be in the form of degrees/minutes/seconds values, degree decimal minute values, universal translator mercator (UTM) values, and so forth. It may be appreciated that MID 414 may not use or populate all of the fields for a given map information record, as desired for a given implementation. The embodiments are not limited in this context.

In various embodiments, MMM 420 may include MLM 408. In one embodiment, for example, MLM 408 may be arranged to generate or define map location correction information for a location in response to user input. The map location correction information may be used, for example, to substitute predefined map location information for the location (e.g., as stored in MID 414). The map location correction information may include the same type of information as the map location information stored in MID 414. The map location correction information, however, may include map location information that has been corrected by mobile computing device 110 in response to a user input. MLM 408 may generate the map location correction information using a number of different techniques. For example, MLM 408 may generate the map location correction information using a global positioning satellite (GPS) system including a GPS transceiver. In another example, MLM 408 may generate the map location correction information using one or more triangulation techniques capable of triangulating a position based on one or more known coordinates, such as cell data as used in cellular radiotelephone systems, for example. In yet another example, MLM 408 may generate map location correction information from user input, such as entering coordinates or tapping on a map. Once mobile computing device 110 generates the map location correction information, MLM 408 may forward the generated location information to MCM 410.

In addition to generating the map location correction information using resources resident on mobile computing device 110, MLM 408 may also generate the map location correction information using resources outside of mobile computing device 110. MLM 408 may send a request for location information from mobile computing device 110 to an external device. For example, MLM 408 may send the request over wireless shared media 122-1 via radio sub-system 202. In another example, MLM 408 may send the request over a wired communications medium connected to mobile computing device 110. Examples of wired communications media may include any of the examples given for wired communications medium 122-2, as well as an IEEE 1394 ("Firewire") cable, USB cable, and others. Examples of an external device may comprise a GPS device, triangulation device, and others. In one embodiment, for example, the external device may be accessible via wireless device 120 and/or network 130. For example, the external device may reside on a server accessible via the Internet. The external device may receive the request from mobile computing device 110, and compute the current location of mobile computing device 110. The external device may send the current location information to mobile computing device 110. MLM 408 may receive the map location correction information, and forward the map location correction information to MCM 410.

Another technique for obtaining correct position information is direct input by the user, either by using a user interface to enter in the correct latitude and longitude coordinates, or tapping on the displayed map. For example, if the incorrect map data shows a house address 100 meters down the street from where it actually is, the user can merely tap on the correct approximate location as it is rendered graphically on the display to register more accurate coordinates.

In various embodiments, MMM 420 may include MCM 410. In one embodiment, for example, MCM 410 may be arranged to generate map correction information for a map using the map location correction information. The map correction information may include map address information and the map location correction information. MCM 410 may receive the map location correction information from MLM 408. MCM 410 may generate map address information to associate with the received map location correction information. MCM 410 may generate the map address information in a number of different ways. For example, MCM 410 may prompt a user to enter the address information to be associated with the map location correction information. MCM 410 may also attempt to automatically generate the address information. For example, MCM 410 may attempt to derive the address information from the map location correction information. MCM 410 may search MID 414 for a map information record storing existing map location information that most closely matches the map location correction information received from MLM 408. MCM 410 may then retrieve the existing map address information from the located map information record. MCM 410 may store the map address information and map location correction information in a map correction database (MCD), such as MCD 416. The embodiments are not limited in this context.

In various embodiments, MMM 420 may include MCD 416. MCD 416 may store the map correction information generated by MCM 410. Similar to MID 414, MCD 416 may store map correction information, such as map address correction information and map location correction information. MCD 416 may store the map correction information using various data structures, such as map correction information records with one or more defined fields. MMM 420 may use the map correction information to create a map correction layer for displaying user defined information for a map. An example of a set of map correction information records for MCD 416 may be shown in Table 2 as follows:

TABLE 2

| Country | State | County | City | Street | Number | Latitude | Longitude | Altitude |
|---|---|---|---|---|---|---|---|---|
| USA | PA | Allegheny | Wexford | Brooktree | 4500 | 40.6155120 | −80.0599940 | 362 meters |
| USA | CA | Santa Clara | Sunnyvale | Maude | 2100 | 37.3947650 | −122.0469970 | 40 meters |
| USA | CA | Santa Clara | San Jose | First Street | 1732 | 37.3678670 | −121.9138980 | 39 meters |

As shown in Table 2, MCD 416 may include any number of map correction information records. Each map correction information record may include map address correction information and map location correction information. The map address correction information fields and map location correction information fields for a given map correction information record stored by MCD 416 may be similar to the map address information fields and map location information fields for a corresponding map information record stored by MID 414. In this example, the map address correction information may include the corrected information stored in the correction fields labeled Country, State, County, City, Street and Number, and the map location correction information may include the corrected information stored in the correction fields labeled Latitude, Longitude and Altitude. It may be appreciated that MCD 416 may not use or populate all of the fields for a given map correction information record, as desired for a given implementation. Furthermore, it may be appreciated that MCD 416 may not necessarily have a map correction information record corresponding to every map information record stored by MID 414. The embodiments are not limited in this context.

As shown in Table 2, MCD 416 may include map location correction information that is different from MID 414. For example, MID 414 may store map location information having a latitude value of 41.6155120 and a longitude value of −81.0599940 for the address "4500 Brooktree Road, Wexford, Pa., 15090." By way of contrast, MCD 416 may include map location correction information having a latitude value of 40.6155120 and a longitude value of −80.0599940 for the same address. The different coordinates of the map location correction information may represent corrected or more accurate physical coordinates as generated by mobile computing device 110 in response to user inputs. MMM 420 may then use the map location correction information for the addresses stored by MCD 416 to replace the predefined map location information for the same addresses stored by MAP 414. In this manner, MMM 420 may cause a location identifier to move from an old position to a new position on the electronic map when displayed.

Once MCM 410 generates map address correction information for the received map location correction information, MCM 410 may search MCD 416 for a map correction information record having the map address correction information. If MCD 416 does not currently have a map correction information record with the map address correction information, MCD 416 may create a map correction information record with the map address correction information. MCD 416 may then store the map correction information with the map address correction information in the new map correction information record. If MCD 416 already has a map correction information record with the map address correction information, MCD 416 may overwrite the existing map correction location information stored in the existing map correction information record with the new map location correction information received from MLM 408.

In various embodiments, MDM 412 or a mapping application may be arranged to display a location identifier at a first position on the electronic map using map location information. For example, a mapping application may display a location identifier for each location on an electronic map. The location identifier may comprise any type of multimedia information, such as text, numbers, an icon, an image, a picture, a symbol, and so forth. The location identifier typically corresponds to map address information and map location information. For example, assume the mapping application attempts to display a location identifier for an address "123 Park Garden Lane, Wexford, Pa., 15090." To display a location identifier on the electronic map, the mapping application may use a map address lookup algorithm to search MID 414 to locate a map information record having map address information matching the address. Once located, the mapping application may retrieve the map location information associated with the address stored in the located record. The mapping application may then position the location identifier on the electronic map using the retrieved map location information.

In various embodiments, MDM 412 may be arranged to display a location identifier at a second position on the electronic map using the map location correction information. MDM 412 may use the map location correction information from MCD 416 to display the location identifier at a second position on the electronic map that is different from the first position. In this manner, the location identifier may be effectively moved or repositioned from the first position to the second position, with the second position having more accurate or precise location information for a given address.

In one embodiment, for example, MDM 412 may display a location identifier by modifying or redirecting the map address lookup algorithm used by the mapping application. For example, MDM 412 may use a modified map address lookup algorithm that is designed to first search MCD 416 to determine whether the map location information provided by the map data provider has an alternative location provided by a user. In another example, MDM 412 may intercept commands from the mapping application and redirect requests to search for digital map information from MID 414 to MCD 416 to determine whether the map location information has been corrected by a user. In both cases, MDM 412 may retrieve any map location correction information stored in MCD 416, and use the retrieved map location correction information to display the location identifier for a given address in lieu of the map location information stored in MID 414. If the map location information has not been corrected by a user as indicated by the absence of a map information correction record stored in MCD 416, MDM 412 may then search and retrieve the original map location information from MID 414, and display the location identifier on display 104 using the original map location information. The embodiments are not limited in this context.

In one embodiment, for example, MDM 412 may display a location identifier by creating a user correction layer. MDM 412 and/or a mapping application may display an electronic map using multiple layers. MDM 412 may add or overlay a user correction layer to the other layers. The user correction layer may be used to display corrections, additions or annotations made by a user. MDM 412 may create the user correction layer using a number of different techniques, which may be described in more detail with reference to FIG. 5.

Figure 5:
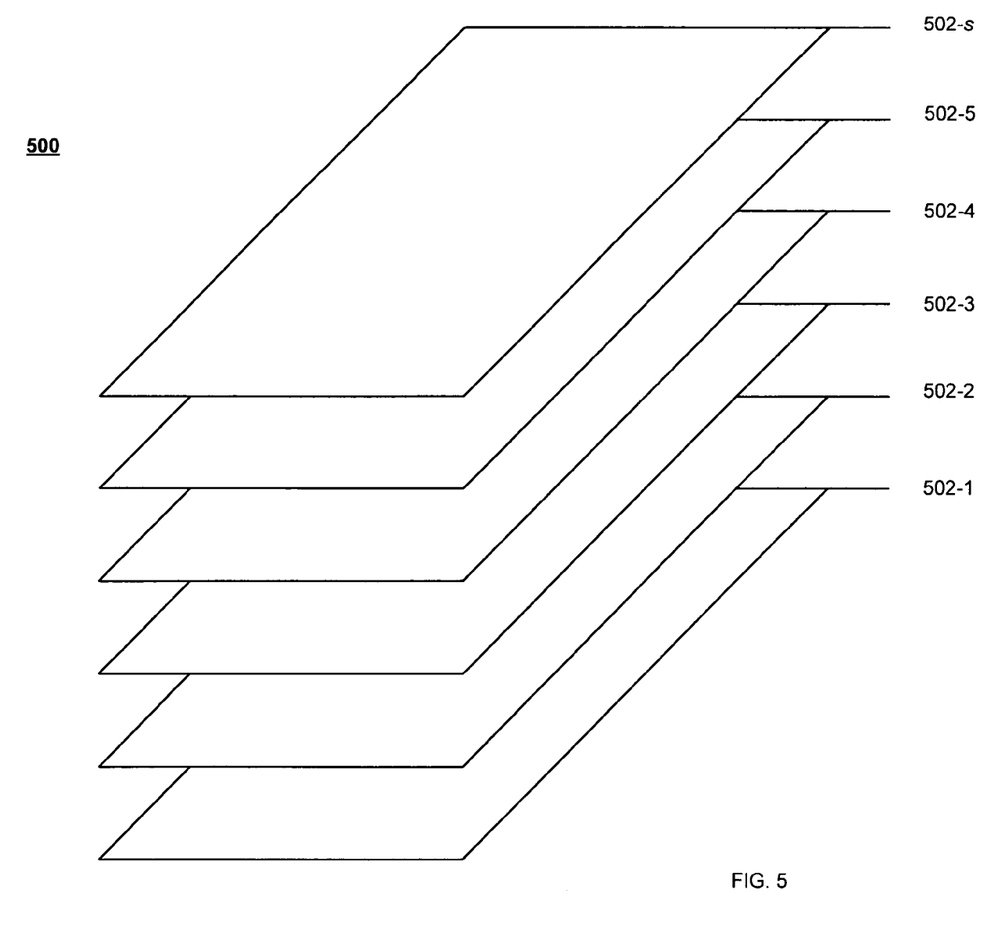
FIG. 5 illustrates one embodiment of a multi-layer map.

FIG. 5 illustrates one embodiment of a multi-layer map. FIG. 5 illustrates a multi-layer map 500. Multi-layer map 500 may comprise multiple layers 502-1-$s$, where s represents an integer. Each layer 502-1-$s$ may provide successive levels of map details, with each layer overlaying or overlapping information on previous layers to add an increasing amount of map information and details of varying granularity to multi-layer map 500. As shown in FIG. 5, multi-layer map 500 may comprise a first layer 502-1. First layer 502-1 may comprise a base map having a basic coordinate field illustrating territorial boundaries, political boundaries, shoreline boundaries, continents, countries, states, counties and so forth. A second layer 502-2 may include street level details, such as addresses, street locations, street names, 2D and 3D renderings, street level attributes (e.g., speed limits, right-of-way, and so forth). A third layer 502-3 may include points of interest (POI) data, such as gas stations, banks, restaurants, offices, commercial buildings, and so forth. A fourth layer 502-4 may include user defined information such as home addresses, location marks, favorite POI, and so forth. A fifth layer 502-5 may include a user correction layer. The user correction layer may include the various user corrections stored in MCD 416. Although only five layers are illustrated by way of example in multi-layer map 500, it may be appreciated that multi-layer map 500 may have any number of layers as desired for a given implementation. For example, multi-layer map 500 may include multiple user correction layers, with each user correction layer corresponding to different user, for example. The embodiments are not limited in this context.

In various embodiments, MMM 420 may display map correction information by modifying or redirecting a map address lookup algorithm to search MCD 416 prior to searching MID 414, as previously described. In some cases, however, MDM 414 may not have access to the map address lookup algorithm used by a given mapping application. In this case, MMM 420 may create one or more user correction layers 502-5 to add, correction, correct or otherwise modify the information provided by any of lower layers 502-1-4. In the case of adding map location correction information, user correction layer 502-5 will operate similar to lower layers 502-1-4 and overlay user defined information to multi-layer map 500. In the case of modifying map information displayed by layers 502-1-4, MDM 412 may operate in one of two modes to create user correction layer 502-5. In a first mode, MDM 412 may transparently overlay any map location correction information over the original map location correction information. This may create a situation where multi-layer map 500 displays multiple location identifiers for a single address. In this case, MDM 412 may annotate the map location correction information in a manner that distinguishes between the multiple indicators or identifiers (e.g., the new indicator may add the word "new" or "corrected"). In a second mode, MDM 412 may overlay any map location correction information over the original map location information in a manner that displays a new position for the location identifier and masks the old position for the location identifier. For example, MDM 412 may generate masking information that covers or hides the location identifier displayed using the original map location information. The particular masking information may be derived from the map information surrounding the original map location information. For example, if the map information surrounding the original map location information comprises a certain percentage of black pixels, MDM 412 may generate masking information having pixel values representing black thereby hiding the incorrect location identifier from view. MDM 412 may generate masking information in any desired size, shape or area sufficient to partially or fully mask the original map location information. In this case, multi-layer map 500 may display the location identifier at a single position for the location of interest. As with the first mode, MDM 412 may annotate the new identifier to indicate to a user that a location has been added, corrected, or modified (e.g., adding the word "new" or "corrected"). The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
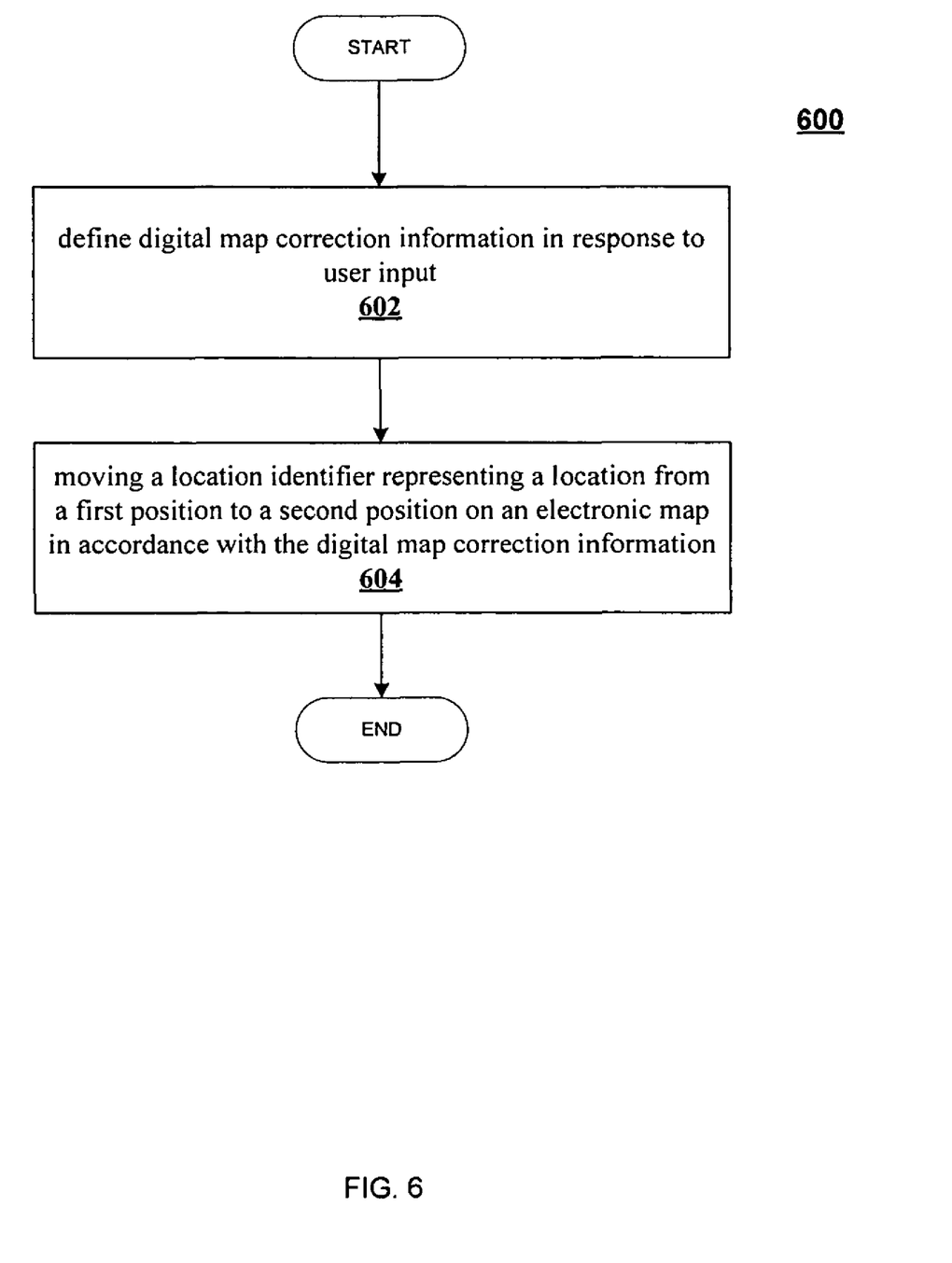
FIG. 6 illustrates one embodiment of a logic diagram.

FIG. 6 illustrates one embodiment of a logic flow. FIG. 6 illustrates a logic flow 600. Logic flow 600 may be representative of the operations executed by one or more embodiments described herein, such as mobile computing device 110. As shown in logic flow 600, digital map correction information may be defined in response to user input at block 602. A location identifier representing a location may be moved from a first position to a second position on an electronic map in accordance with the digital map correction information at block 604. The embodiments are not limited in this context.

In one embodiment, for example, map location correction information for the location may be generated in response to user input. The map location correction information may be used to replace predefined map location information for the location. The embodiments are not limited in this context.

In one embodiment, for example, the map location correction information may be stored in a map correction database. The embodiments are not limited in this context.

In one embodiment, for example, the location identifier may be displayed at the second position on the electronic map using the map location correction information. The embodiments are not limited in this context.

In one embodiment, for example, the electronic map may be displayed using multiple layers. One of the layers may include a user correction layer to display the location identifier at the second position on the electronic map using the map location correction information. The embodiments are not limited in this context.

The various embodiments described in FIGS. 1-6 may be further described by way of example. In this example, assume a location identifier for a given address is displayed at an incorrect position on the electronic map. For example, MID 414 may store a map information record having the map address information of "4500 Brooktree Road, Wexford, Pa., 15090." The map information record may have the map location information of latitude value of 41.6155120 and a longitude value of −81.0599940 associated with the map address information. Using the map location information, the electronic map may display a location identifier for the address as being located on one side of a street, while the actual physical location for the given address is located on the opposite side of the street.

A user may use MMM 420 of mobile computing device 110 to move the location identifier for the residence to the opposite side of the street. The user may position mobile computing device 110 over a physical location or area for the given address. The user may activate MMM 420 of mobile computing device 110 using I/O device 106, such as by pressing a hard or soft button or a sequence of hard or soft buttons.

MLM 408 may receive a signal from I/O device 106 representing the user input, and generate map location correction information for a location in response to the user input. MLM 408 may generate the map location correction information using an internal or external GPS system. For example, MLM 408 may generate map location correction information having a latitude value of 40.6155120 and a longitude value of −80.0599940 for the same address. MLM 408 may pass the map location correction information to MCM 410.

MMM 420 may then use the map location correction information for the addresses stored by MCD 416 to replace the predefined map location information for the same addresses stored by MAP 414. MCM 410 may generate map correction information for an electronic map using the map location correction information received from MLM 408. MCM 410 may store the map location correction information in MCD 416. MDM 412 may display the corrected location on the electronic map using the map correction information, either by modifying a map address lookup algorithm to retrieve information from MCD 416 rather than MID 414, or by generating a user correction layer (e.g., user correction layer 502-5). In this manner, a user may add, correct, or modify a location for a map with user defined information, rather than being limited by updates or corrections offered by the original map provider or designer. The user may therefore customize an electronic map according to a desired set of user preferences.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to memory 406. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
   a processor;
   a map management module, executed by the processor, to move a location identifier representing a point of interest from a first position to a second position on an electronic map in accordance with received digital map correction information, the received digital map correction information is generated by tapping on a display of the mobile computing device; and
   a map location module, executed by the processor, to generate corrected latitude and longitude coordinates for the point of interest corresponding to the second position on the electronic map, the corrected latitude and longitude coordinates to replace predefined latitude and longitude coordinates for the point of interest.

2. The mobile computing device of claim 1, comprising a map correction module to store the corrected latitude and longitude coordinates in a map correction database.

3. The mobile computing device of claim 1, comprising a map display module to display the location identifier at the second position on the electronic map using the corrected latitude and longitude coordinates.

4. The mobile computing device of claim 1, the map location correction module to generate corrected altitude information for the point of interest.

5. A computer-implemented method, comprising:
   receiving, by a mobile device, digital map correction information, the digital map correction information is generated by tapping on a display of the mobile computing device;

moving, by a processor of the mobile device, a location identifier representing a point of interest from a first position to a second position on an electronic map in accordance with the digital map correction information; and generating, by the processor, corrected latitude and longitude coordinates for the point of interest corresponding to the second position on the electronic map, the corrected latitude and longitude coordinates to replace predefined latitude and longitude coordinates for the point of interest.

6. The method of claim 5, comprising storing the corrected latitude and longitude coordinates in a map correction database.

7. The method of claim 5, comprising displaying the location identifier at the second position on the electronic map using the corrected latitude and longitude coordinates.

8. An article of manufacture comprising a computer-readable storage medium containing instructions that, when executed by a processor, enable a system to:

receive digital map correction information at a mobile computing device indicating a position for a location identifier via an electronic map, the location identifier representing a location;

move the location identifier representing the location from a first position to a second position on the electronic map in accordance with the digital map correction information, the digital map correction information is generated by tapping on a display of the mobile computing device; and generate corrected latitude and longitude coordinates for the location corresponding to the second position on the electronic map, the corrected latitude and longitude coordinates to replace predefined latitude and longitude coordinates for the location.

9. The article of claim 8, further comprising instructions that, when executed by a processor, enable a system to:

store said map location correction information in a map correction database.

10. The article of claim 8, further comprising instructions that, when executed by a processor, enable a system to:

display the location identifier at the second position on the electronic map using the map location correction information.

\* \* \* \* \*